Fig.1

Nov. 13, 1934.  D. F. EVANS ET AL  1,980,392
SLITTING MACHINE
Filed Dec. 2, 1931   7 Sheets-Sheet 3

INVENTORS
David F. Evans
Clarence E. Coleman
BY John Lawrence Seymour
ATTORNEY.

Fig. 7

Nov. 13, 1934.   D. F. EVANS ET AL   1,980,392
SLITTING MACHINE
Filed Dec. 2, 1931   7 Sheets-Sheet 7

Patented Nov. 13, 1934

1,980,392

UNITED STATES PATENT OFFICE 1,980,392

SLITTING MACHINE

David F. Evans and Clarence E. Coleman, Buffalo, N. Y., assignors to Du Pont Cellophane Company, Inc., New York, N. Y., a corporation of Delaware Application December 2, 1931, Serial No. 578,430

36 Claims. (Cl. 164—65)

This invention relates to the art of slitting. More particularly the invention relates to the art of slitting travelling webs or films into a number of narrower webs or films. Still more specifically this invention relates to a slitting machine.

For a great many purposes paper, or regenerated cellulose or the like, is best kept in the form of rolls. In order that these rolls may be adapted to a particular purpose it is necessary that they be cut and rewound into rolls of less width and possibly of less diameter. The prior art presents several machines which are capable of performing this slitting in a satisfactory manner but in each instance these machines are large, cumbersome and not adapted to easy change. So far as we are aware, the prior art presents only machines having a double sided frame. With such machines the changing of rolls and the changing of the cutting apparatus from the cutting of one width to the cutting of a sheet having a different width is a complicated and laborious operation requiring the dismantling of much of the machine. This results in enforced idleness of the machine during considerable periods of time, and in a cost in labor and time out of proportion to the value of small orders.

It is an object of this invention to provide a slitting machine which is capable of practically instantaneous adjustment to the slitting of any film of any width up to its capacity. Another object of the invention is to construct a machine capable of operation at different speeds in order to adapt the speed of the machine to the material which is being cut and thus to secure a more perfect slitting and a consequently improved product. Another object of the invention is to provide a winding mechanism. Another object of the invention is to provide a new slitting mechanism. A further object of the invention is to provide a new score roll. A further object of the invention is to provide a new winding mandrel. Another object of the invention is to provide a new mill roll. Another object of the invention is to provide a new driving mechanism. Other objects of the invention will be in part apparent and in part set forth as the description proceeds.

The objects of this invention are accomplished, generally speaking by the use of an open-end slitting machine and by the details of the invention as set forth in the following specification.

In the drawings, 1 indicates generally a frame; 11 is a housing forming a portion of the frame; 12 indicates a side of the frame which is extended beyond the housing; 13 indicates the base of the frame which is also extended beyond the housing; 14 is a portion of the housing which is preferably integral with the extended side and base; 141 is an inclined face in said housing; 142—143—144 are semi-cylindrical depressions in the face 141 of said housing portion 14; 15 is a portion of said housing; 151 is a face on portion 15 which is homologous with face 141 and in assembled position lies against face 141; 152—153—154 are semi-cylindrical depressions in the face 151 which in assembled relation form, in conjunction with depressions 142—143—144 respectively, cylindrical seats for shaft bearings; 16 is a face on housing 15 provided with semi-cylindrical depressions 161; 17 is a portion of the housing; 170 is a face on said housing portion 17 which abuts face 16 of housing portion 15 in assembled relation; 171 are semi-cylindrical depressions in the face 170 which cooperate with semi-cylindrical depressions 161 in face 16 to form cylindrical seats for shaft bearings.

A particular feature of our invention resides in the arrangement of the slitting and winding elements. These elements are mounted at one end in the frame, project from the side thereof, and are preferably supported only at the frame end. By this construction a slitting machine is provided which is open-ended and capable of extremely rapid manipulation and adjustment.

In the drawings, 2 is a mill roller which holds the roll of material which is to be slit; 3 are idler rolls which serve to take the wrinkles out of the sheet of material before it reaches the slitting elements proper; 4 is a score roll against the surface of which, in the machine shown in the drawings, the actual slitting takes place; 5 are winding mandrels for rewinding the slit material into narrower rolls; 6 refers generally to the fulcrum bar and its operating mechanism; 7 refers generally to the slitting member which operates against the score roll and to its operating mechanism; 8 refers generally to a nip roll whereby the sheet of material to be slit is kept in firm and smooth contact with the surface of the score roll.

M is a motor which is preferably mounted on the extended base of the frame outside of the housing in order that adjustments or repairs may be made without disturbing the housing. DM is a drive wheel attached to the motor. DS is a driven wheel outside of the housing which is connected to the drive wheel DM by a suitable driving connection D.

Figure 10:
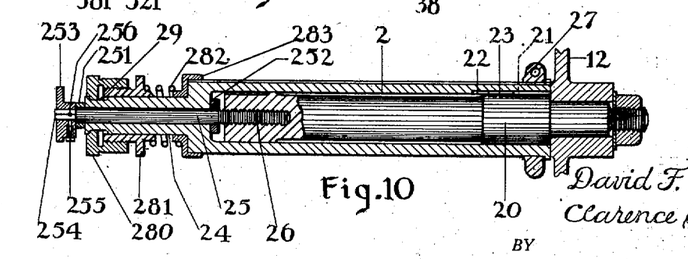
Figure 10 is a detail on line 10—10 of Figure 7.

The construction of the mill roller is, referring particularly to Figure 10, as follows:—

20 is a stud mounted in a boss in the extended side 12 of the housing; 21 is a keyway in said stud; 2 is a sleeve mounted on said stud; 22 is a keyway of considerable length in the sleeve; 23 is a key seated in the keyways 21 and 22 to prevent rotation of sleeve 2 about stud 20; 24 is a reduced end on sleeve 2; 25 is a screw mounted for rotational movement in the reduced portion 24; 251—252 are means of suitable nature which prevent longitudinal motion of screw 25 in sleeve portion 24 but which permit the rotation of screw 25 in reduced portion 24; 253 is a thumb or hand wheel for turning screw 25; 26 is a threaded bore in stud 20 in which is seated the threaded end of screw 25; 254 is a square end on screw 25; 255 is a spring pressed plunger in wheel 253; 256 are depressions in screw portion 254 which cooperate with plunger 255 to keep the hand wheel in place; 27 is a split ring which is clamped about sleeve 2 and which may be moved to any position on sleeve 2 to serve as an abutment against which a roll of the material which is to be slit will rest.

Means are provided at the open end of the sleeve for applying friction to the roll of material to be slit. The construction of this mechanism is as follows:

280 is an internally threaded cap mounted on the end of the reduced portion 24 of the sleeve 2; 281 is a collar mounted on the reduced portion of the sleeve in threaded engagement with cap 280; 283 is a washer having an annular flange overlying the large portion of sleeve 2 and capable of abutting the core of a mill roll or of abutting spacing rings placed between the washer and the core of a mill roll; 282 is a spring mounted between collar 281 and washer 283; 29 is a means, such as a bayonet slot, whereby cap 280, spring 282, collar 281, and washer 283 may be instantaneously removed from the sleeve to permit the placing on, or removal, of a roll from the sleeve.

In the operation of the machine the hand wheel 253 will be removed from the end of the screw; the cap 281 will be loosened from its bayonet slot and will be withdrawn with its cooperating mechanism from the reduced portion of the sleeve; a roll of material, preferably but not necessarily mounted on a core of cardboard or other suitable material, will be slipped over the sleeve; abutting collar 27 will be moved into a position to properly aline the roll; a sufficient number of spacing rings will be placed between the outer end of the roll and the washer 283 to permit the collar to exert spring pressure against the roll; the cap and collar and its adjusting mechanism will be placed in position and the hand wheel restored to place. After the material from the mill roll has been threaded about the proper rolls and has been trained to the wind-up, the proper degree of friction can be exerted against the mill roll to prevent its turning too easily or too hard by turning collar 281 to either increase or decrease the spring pressure against washer 283.

It often happens that, regardless of the care taken in threading the material through the machine, a misalinement occurs which causes wrinkles in the material and a consequently inferior cut. This misalinement can be instantly adjusted in our machine by rotating the hand wheel 253. By the rotation of this hand wheel the screw 25 is turned inwardly or outwardly in the thread 26. Since the sleeve 2 is attached with axial immovability to the screw, the motion of the screw inwardly or outwardly will result in an equal motion, inwardly or outwardly, of the sleeve and of the roll mounted on the sleeve. It is thus possible to instantaneously, and even with the machine in motion, adjust for best results the alinement of the material in the machine.

Figure 1:
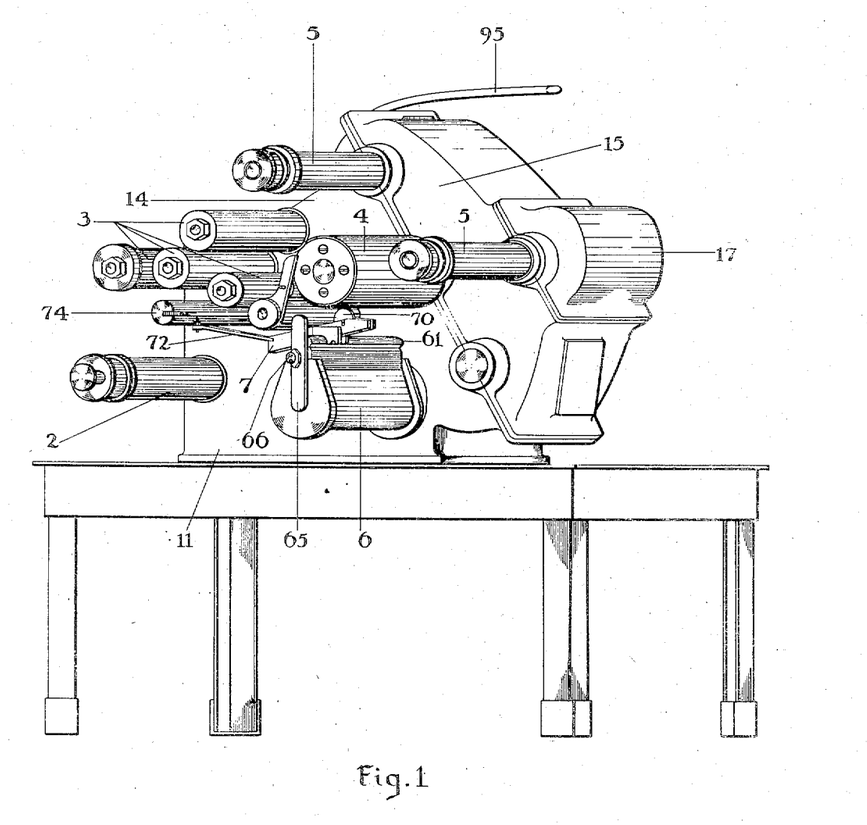
Figure 1 is a perspective of a machine built in accordance with the principles of our invention.
Figure 2:
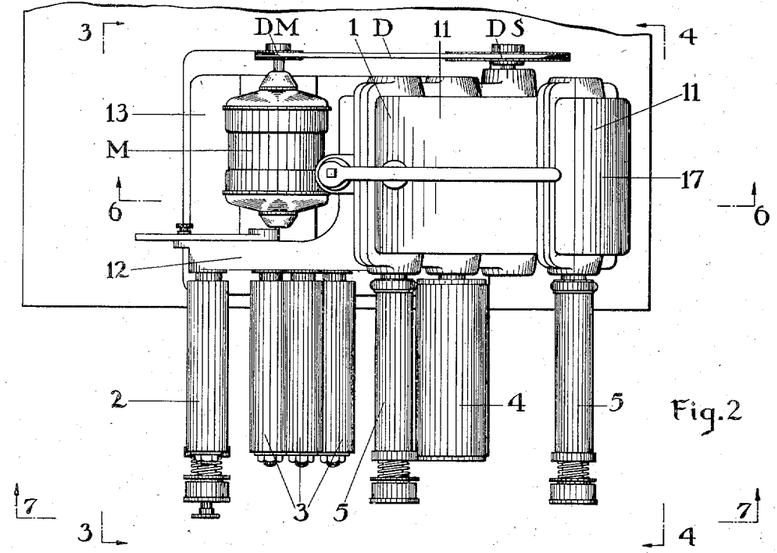
Figure 2 is a plan view of the same machine taken from the position 2—2 of Figure 7.
Figure 3:
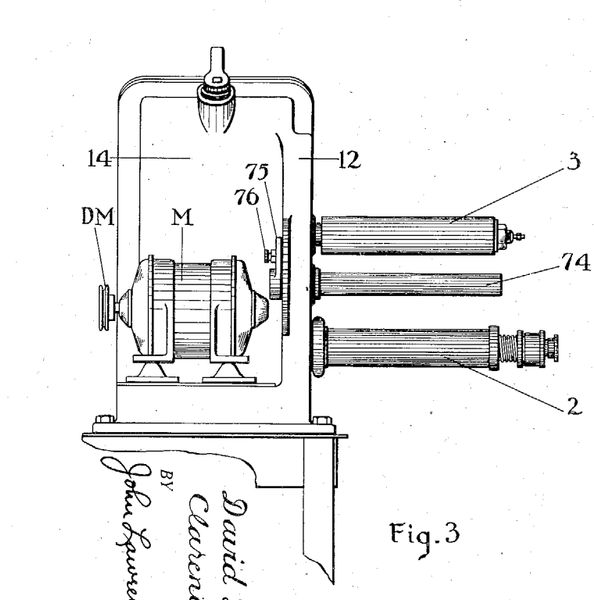
Figure 3 is an end view of the same machine taken from the position 3—3 of Figure 7.
Figure 4:
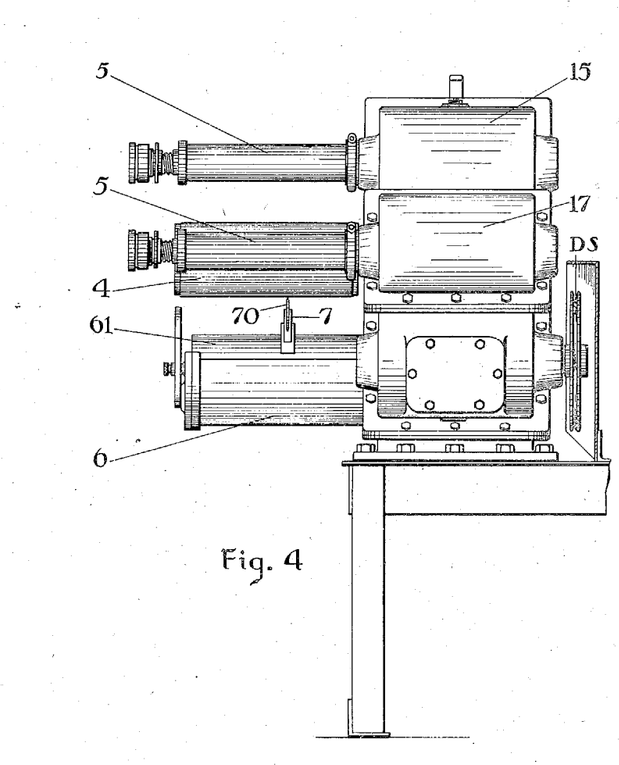
Figure 4 is an end view of the same machine taken from position 4—4 of Figure 7.
Figure 5:
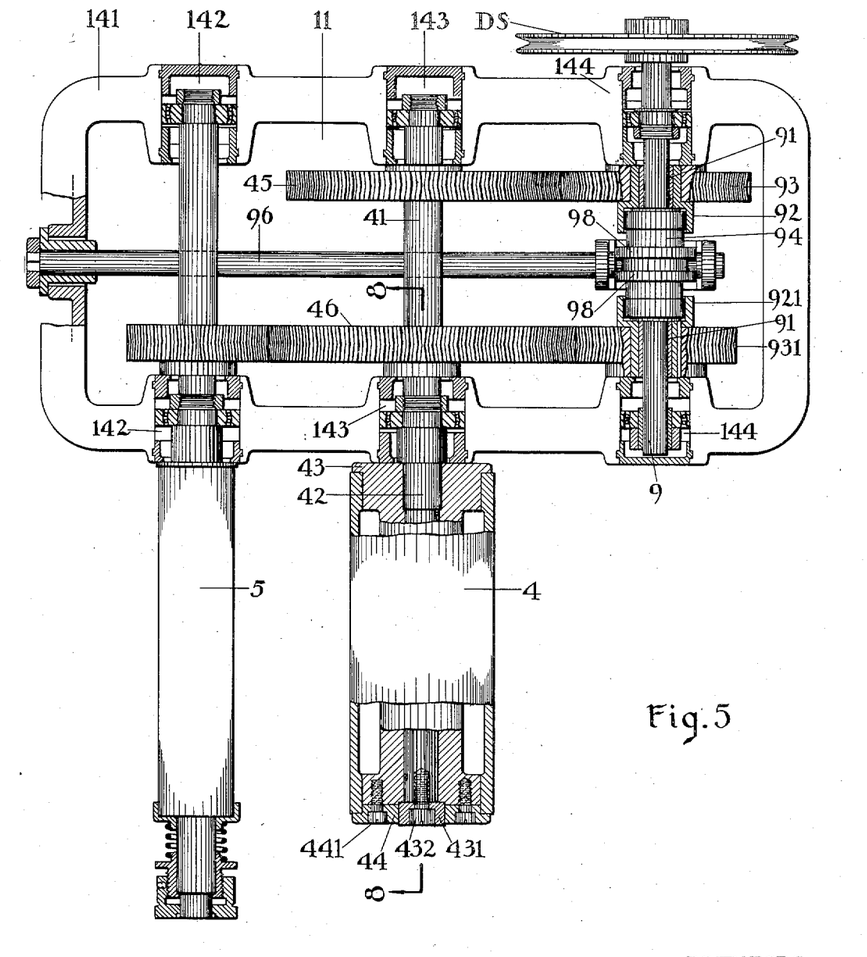
Figure 5 is a view partially in section taken on the line 5—5 of Figure 7.
Figures 6, 9:
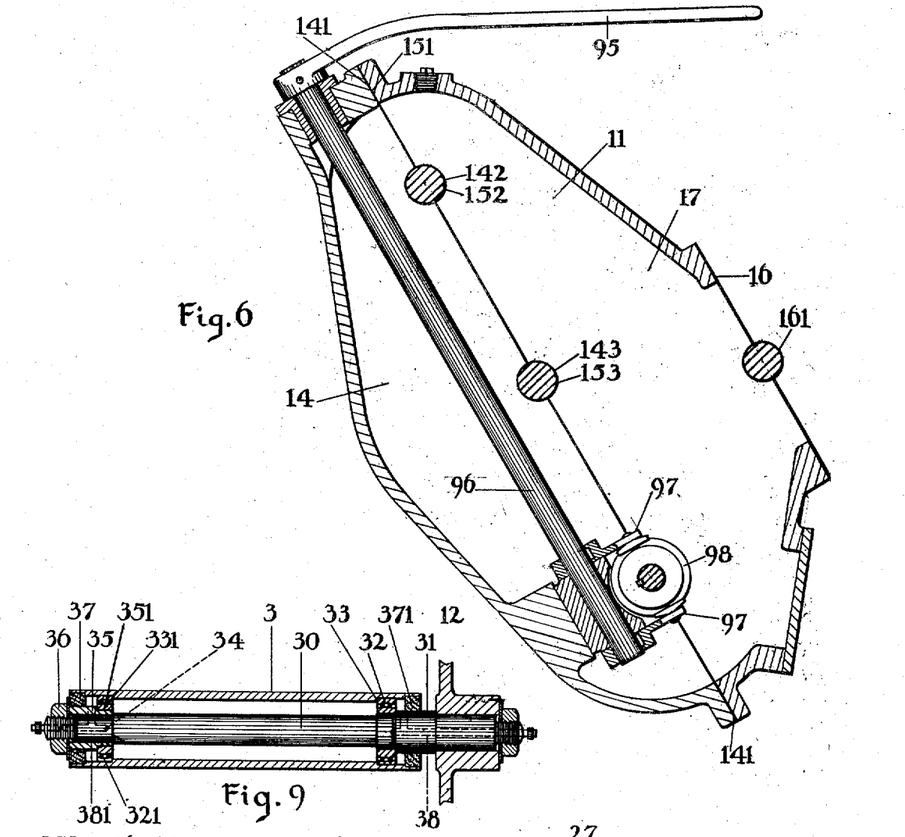
Figure 6 is a section through the housing taken on the line 6—6 of Figure 2.
Figure 9 is a detail on the line 9—9 of Figure 7.
Figure 7:
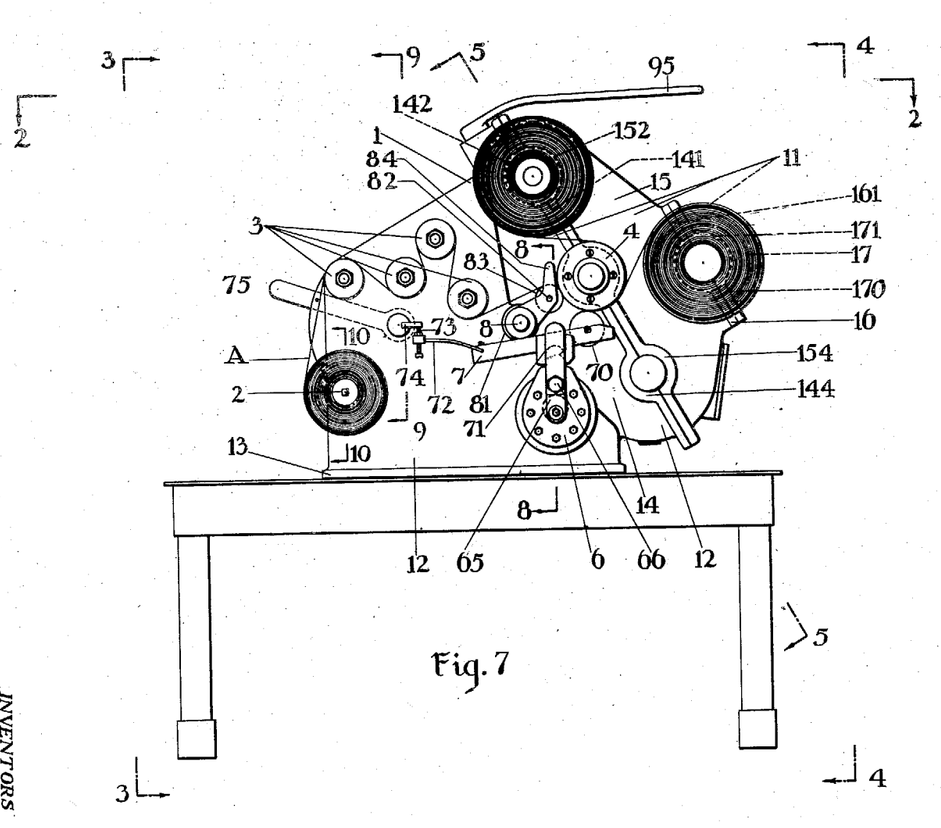
Figure 7 is a side view from the position 7—7 of Figure 2.
Figure 8:
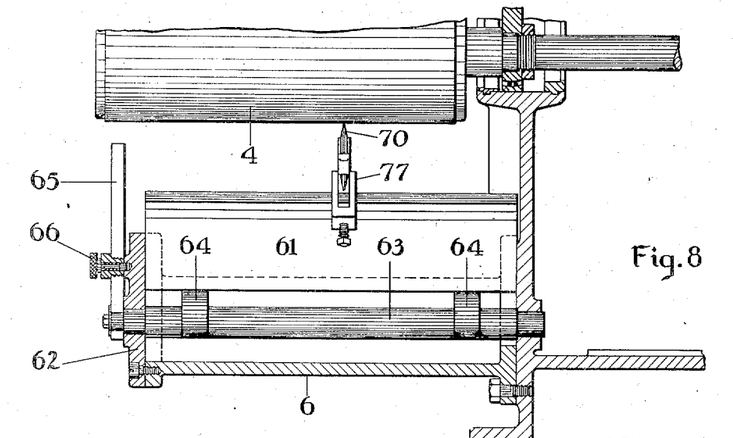
Figure 8 is a view partially in section on line 8—8 of Figure 7.

As shown in Figure 7, the sheet of material A is drawn from the surface of the roll and passes over idler rollers 3. In the construction of these idler rollers (Fig. 9) 30 is an axle mounted in a boss in the extended side of the frame; 31 is an enlarged portion in axle 30 which forms a shoulder for abutment against the frame and a shoulder against which an anti-friction bearing may abut; 32 is an anti-friction bearing on axle 30 abutting shoulder 31; 33 is an internal shoulder on cylindrical roller 3 which abuts bearing 32; 34 is a reduced portion on the outer end of the axle; 35 is a collar member fitting over said reduced portion; 321 is an anti-friction bearing abutting against an internal shoulder 331 on said cylindrical roller and against a shoulder 351 on collar 35; 36 is a nut whereby the construction is held in assembled relations; 37—371 are oil retaining rings of leather or suitable composition; 38—381 are passages drilled in the ends of the axle for the passage of lubricant to the respective bearings. The entrances to these passages may, of course, be provided with suitable grease fittings.

After passing over the smoothing rollers 3 the web of material passes around the nip roll whose function is to keep the material in smooth and firm contact with the surface of the score roll. In the construction of this roller, 8 is a shaft projecting from the side of the frame; 81 are arms pivotally mounted on said shaft; 82 is an axle mounted on said arms; 83 is a roller mounted on said axle in a position to abut against the surface of score roll 4; and 84 is a handle by which roller 83 may be swung out of contact with the score roll 4.

Cooperating with the score roll to slit the sheet as it passes thereunder is a slitting mechanism in which 7 is a cutter-holding lever; 70 is a score cutter mounted in bearings in the bifurcated end of the lever and cooperating with the score roll to score cut the paper; 71 is a notch in the lever which may be conveniently curved to conform to the curved top of the fulcrum bar 61 upon which it rests; 72 is a leaf spring attached to the end of the lever and projecting toward the mill roll end of the machine; 74 is a pivotally mounted setting bar projecting from the frame; 75 is a handle for positioning the setting bar; 76 is a spring pressed detent for holding the setting bar in a given position by cooperation with holes or indentions in the frame; and 73 is an adjustable connection between the spring 72 and the setting bar by means of which the pressure of the score cutter against the score roll may be regulated for a given setting of the handle. 77 illustrates one method by which the cutter lever may be held in position on the fulcrum bar.

In the construction of the fulcrum bar mechanism, 6 is a guide attached to the frame by suitable means and projecting outwardly therefrom; 61 is a fulcrum bar mounted in said guide; 62 is an end plate on said guide; 63 is a shaft mounted at its ends in the end plate 62 and the frame of the machine; 64—64 are eccentrics on said shaft by means of which the fulcrum bar may be adjusted in the guides; 65 is a lever attached to the outer end of the shaft 63; 66 is a spring pressed detent which cooperates with holes in the face of end plate 62 to hold the eccentric in adjusted position.

Figure 11:
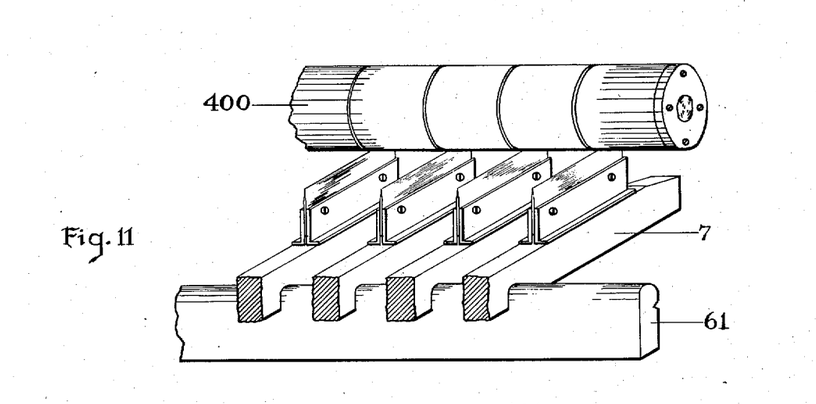
Figure 11 is a detailed view showing a knife blade slitter arranged in place.

In Figure 11, 400 represents the cover of roll 4 provided with slots for the reception of knife blades; 7 are the cutter supports pivoted, as in the other figures of the drawings on adjustable bar 61. The knife blades as shown are removable from the knife blade holders. Slots in bar 61 are arranged so that the knife blades will automatically, when being put into operative position, enter the slots.

Figure 12:
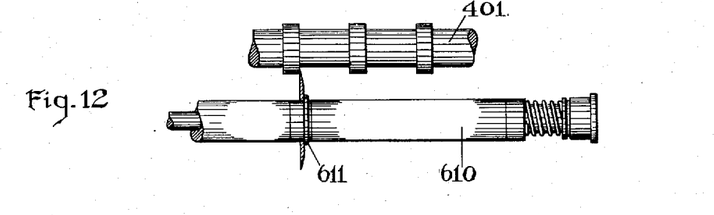
Figure 12 shows a shear cutting slitter.

Figure 12 shows a cutting mechanism operating on the shear cutting principle. In this figure 401 is a driven roll equivalent to 4 of the other figures, projecting from the side of the machine and carrying on its surface circular knives; 610 is a lower roller, preferably not driven, which carries circular knives 611 designed to make contact with the knives of mandrel 401. The knives 611 will be spaced from each other by spacing sleeves in a manner known to persons skilled in the art and held in contact with the cooperating knife by means of a spring operating on the end of the shaft as shown.

Figure 13:
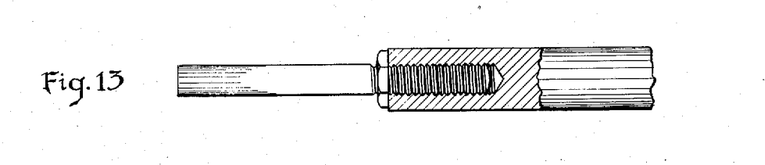
Figure 13 shows a mandrel in two pieces.

Figure 13 shows a mandrel of the type of mandrel 5 made in two separable pieces which are held together by a screw thread and a lock nut.

The operation of the cutting mechanism just described will be somewhat as follows:

Before the material to be slit is threaded through the machine it will be determined in what widths the material is to be cut. The handle 75 is lowered to remove tension from the cutter; the lever 65 is lowered, turning the eccentric, lowering the fulcrum bar, and lowering the cutter out of operative position. The widths in which the sheet is to be slit having been determined, the proper number of cutter levers, properly spaced, are mounted on the fulcrum bar; the material to be slit is threaded through the machine and into contact with the under surface of the nip roller; the lever 65 is raised until the cutters 70 make contact with the material; the lever 75 is raised to lower pivoted setting bar 74 which, through the tension of spring 72 and pivotal mounting of lever 7 on the fulcrum bar forces the score cutter to engage the score roll with resilient force sufficient to cause a good cut. By adjusting screw 73 the degree of tension can be widely varied.

After leaving the score roll 4 the slit sections are wound on mandrels 5. In winding this material cores of cardboard or other material are placed on the mandrels 5. These cores with their accumulated rolls of material are easily and quickly removed. Since the surface of these rewinding mandrels is plain and since the cores would slip on them, we prevent this slippage by the use of a mechanism like that described in connection with the mill roll, that is to say, by applying friction to the end of the core or to a spacing washer which is in contact with the core.

In the driving mechanism of the machine, 142—143—144 are the heretofore described cylindrical bosses forming seats for bearings, which may advantageously be of anti-frictional character; 9 is a drive shaft to the projecting end of which is attached driven wheel DS; 92—921 are clutch elements mounted for free turning motion on bearings 91—91 about shaft 9; 93—931 are gears keyed to said revolvable clutch elements for rotation therewith. These gears are preferably of different sizes to secure a two speed selective drive. 94 is a clutch element keyed to shaft 9 so as to turn therewith; 95 is a handle above the machine; 96 is a shaft mounted in bearings in the housing, projecting at its upper end through the housing, and having handle 95 attached to said projecting end; 98—98 are rings of the clutch member spaced to form an annular groove between them; 97—97 are arms, keyed to shaft 96 and operating in the said groove, by means of which the clutch may be selectively engaged with either clutch member 92 or clutch member 921.

It will be seen by this construction that when the handle 95 is maintained in central position the clutch 94 rotates with the shaft 9 out of contact with either clutch member 92 or 921. When the handle is thrown the clutch engages one of said clutch members, which is forced to turn in unison with it, thereby turning gear 93 or gear 931 as the case may be. When gear 93 is driven, gear 931 and its attached clutch element is free to idle about the shaft, and vice versa.

By the construction above described one of two speeds may be selectively used. In many cases this is sufficient. Occasions occur, however, when a larger variety of speeds is desirable to adapt the machine to the cutting of a wide variety of materials. This additional flexibility can be obtained by the use of suitable gearing or, more easily, by the use of a variable speed motor.

In the structure mounted in cylindrical bosses 143 hereinbefore described, 41 is a shaft mounted in bearings which are preferably of anti-friction type; 42 is an extension on said shaft for a preferably integral end which extends beyond the side of the housing; 43 is a spool mounted on the extension and held in place by block 431 and screw 432; 4 is a cylindrical facing which is preferably very hard and which forms the surface of the score roll against which the cutters act; 44 is an end plate which, with screws 441, keeps the cylinder 4 in position on spool 43; 45 and 46 are gears keyed to shaft 41 which engage with gears 93 and 931 respectively.

Of the winding mandrels one is mounted in cylindrical bosses 142 and the other in cylindrical bosses 171. Referring to the structure of the mandrel mounted in bosses 142, 5 is a shaft mounted in anti-friction bearings in said bosses and provided with an enlarged section projecting beyond the housing to form the mandrel. On the outer end of this section is mounted a mechanism, for exerting pressure against a wind-up core, similar to the one already described in connection with the mill roller.

Our invention is susceptible of many modifications. These modifications can be made in the housing, in the location of the motor, in the structure of the mandrels and rollers of the slitting mechanism, in the slitting mechanism itself, and in the details thereof. For instance, a knife blade slitter could be substituted for the score cutter shown, or a shear cutting mechanism could be used in place of that disclosed; one mandrel or more than two mandrels could be used for rewinding the slit material; the machine has been shown on a platform-like mounting, but it is obviously capable of being mounted to suit the needs of the particular situation; other types of clutch may be substituted for the type shown; the ratio of the gears may be varied to give speeds relatively close to each other or of relatively great difference; the bearings shown may be substituted by any other suitable type of bearing; the method of mounting rollers and mandrels is illustrative of methods whereby the rollers and mandrels may be mounted firmly at one end to project from a side of the machine; the mandrels and the various shafts are shown as integral but could be in two or more pieces.

An advantage of this invention lies in the construction of a machine which is open-ended and which is, consequently, capable of rapid dismantling and assembly. Another advantage of the invention lies in the capability of the machine for either slow or fast cutting to conform to the nature of the material to be cut. Another advantage of the invention lies in the ability of the machine to cut materials more perfectly by reason of its adaptability to a particular material. Another advantage of the invention lies in the reduction of handling charges by reason of its ease and speed of operation. Another advantage lies in the capability of the machine for instantaneous and highly accurate adjustment while in operation. Other advantages of the invention lie in the details of construction of the machine which have been hereinbefore described. Other advantages of the invention will be obvious from a reading of the specification.

As many apparently widely different embodiments of this invention may be made without departing from the spirit and scope thereof, it is to be understood that we do not limit ourselves to the specific embodiments thereof except as defined in the appended claims.

We claim:

1. In a slitting machine a frame comprising a housing, slitting and winding mechanism supported by and projecting from said housing, and means within the housing for driving said slitting and winding mechanism selectively at high speed or at low speed.

2. In a slitting machine a frame comprising a housing, slitting and winding mechanism supported by and projecting from said housing, means within the housing for driving said slitting and winding mechanism at high speed, means within the housing for driving said slitting and winding mechanism at low speed, and means for selectively employing either the high or the low speed means.

3. In a slitting machine a frame comprising a housing, slitting and winding mechanism supported by and projecting from said housing, and means within the housing for driving said slitting and winding mechanism comprising high-speed gears for operating the mechanism at high speed, low-speed gears for operating the mechanism at low speed, and means for selectively employing one or the other of said gears.

4. In a slitting machine a frame comprising a housing, slitting and winding mechanism projecting from said housing comprising a slitting roller, a winding mandrel, an adjustable setting bar, an adjustable fulcrum bar, cutting means mounted on said fulcrum bar for cooperation with said slitting roller, and an adjustable and yieldable connection between said cutting means and said setting bar; shafts within the housing; means for driving one of said shafts; a clutch connected to said shaft; means between said shafts and said clutch whereby one of the slitting and winding elements is driven; and means for operating the clutch.

5. In a slitting machine a frame comprising a housing, slitting and winding mechanism projecting from said housing comprising a slitting roller, a winding mandrel, an adjustable setting bar, an adjustable fulcrum bar, a cutter holder mounted on said fulcrum bar, a cutter mounted in said holder for cooperation with said slitting roller, and an adjustable and yieldable connection between said holder and said setting bar; a mechanism for driving said slitting and winding means comprising a shaft within said housing, a clutch element on said shaft, gears mounted on either side of said clutch element, means for shifting said clutch into driving relation with the said gears, shafts in the housing, and means between said shafts and the gears on the drive shaft whereby one of the said slitting and winding elements is driven.

6. In a slitting machine a frame comprising a housing having an extended side; slitting and winding mechanism projecting from said side comprising a slitting roller, a winding mandrel, a pivotally mounted setting bar, an adjustable fulcrum bar, a cutter holder mounted on said fulcrum bar, a cutter mounted in said holder for cooperation with said slitting roller, and an adjustable and spring connection between said holder and said setting bar; and a mechanism for driving said slitting and winding means comprising a drive shaft within said housing, a clutch element on said shaft, gears mounted on either side of said clutch element, means for shifting said clutch element into driving relation with a said gear, shafts in the housing, an extension on one said shaft projecting beyond said housing to comprise one of said slitting and winding elements, and means between said shafts and the gears on the drive shaft whereby one of the said slitting and winding elements is driven.

7. In a slitting machine a frame comprising a housing having an extended side; slitting and winding mechanism projecting from said side comprising a slitting roller, a winding mandrel, a guide and a fulcrum bar mounted for reciprocation in the guide; slitting means comprising a cutter mounted on said fulcrum bar, a cutter mounted in said holder for cooperation with said slitting roller, a setting bar pivotally mounted in said extended side, and an adjustable and spring connection between said holder and said setting bar; mechanism for driving said slitting and winding means comprising a driven shaft within said housing, a clutch element slidably mounted on said shaft, gears of different sizes mounted on either side of said clutch element, means for shifting said clutch element into driving relation with a said gear, shafts in the housing, an extension on one said shaft projecting beyond said housing to comprise one of said slitting and winding elements and means between said shafts and the gears on the drive shaft whereby one of said slitting and winding elements is driven.

8. In a slitting machine a frame comprising a housing having an extended side; slitting and winding mechanism projecting from said side comprising a slitting roller, a winding mandrel, a guide, and a fulcrum bar mounted for reciprocation in the guide; slitting means comprising a cutter holder mounted on said fulcrum bar, a cutter mounted in said holder for cooperation with said slitting roller, a setting bar pivotally mounted in said extended side, and an adjustable and spring connection between said holder and said setting bar; mechanism for driving said slitting and winding means comprising a source of power, a shaft within said housing, means for driving said shaft, a clutch element slidably mounted on said drive shaft, gears of different size mounted on either side of said clutch element for rotation about said shaft, and means extending through the housing for shifting said clutch into driving relation with a said gear; and means within said housing for driving elements of the said slitting and winding mechanism comprising shafts in the housing, an extension on one said shaft projecting beyond said housing to comprise one of said slitting and winding elements, and gears between said shafts and the gears on the drive shaft whereby one of the said slitting and winding elements is driven.

9. In a slitting machine a frame comprising a housing having an extended side; a motor adjacent thereto; slitting and winding elements projecting from said side comprising a supporting roller, a smoothing roller, a slitting roller, a winding mandrel, an elongated guide, an eccentric therein, and a fulcrum bar mounted therein for reciprocation by the eccentric; slitting means comprising a lever mounted on said fulcrum bar, a cutter mounted in said lever for cooperation with said slitting roller, a spring extending from said lever, a setting bar pivotally mounted in said extended side, and an adjustable connection between said spring and said setting bar; driving mechanism within said housing for said slitting and winding means comprising a drive shaft, means for driving said shaft from said motor, a gear mounted for rotation about said drive shaft, a gear of different size mounted for rotation about said drive shaft, a clutch element slidably mounted on said drive shaft, and means extending through the housing for shifting said clutch into driving relation with a said gear; driven mechanism within said housing comprising shafts mounted in the sides of the housing, an extension on one said shaft projecting beyond said housing to comprise one of said slitting and winding elements, and gears between said shafts and the gears on the drive shaft whereby one of the said slitting and winding elements is driven.

10. In a slitting machine a frame comprising a base, and a housing having an extended side; a motor on said base; slitting and winding elements projecting from said side comprising a supporting roller, a smoothing roller, a slitting roller, a winding mandrel, an elongated guide, an eccentric therein, and a fulcrum bar mounted therein for reciprocation by the eccentric; slitting means comprising a lever mounted on said fulcrum bar, a score cutter mounted in said lever for cooperation with said slitting roller, a leaf spring extending from said lever, a setting bar pivotally mounted in said extended side, and an adjustable connection between said spring and said setting bar; driving mechanism within said housing for said slitting and winding means comprising a drive shaft revolvably mounted in the sides of the housing, means for driving said shaft from said motor, a gear mounted for rotation about said drive shaft, a gear of different size mounted for rotation about said drive shaft, a clutch element fixed to each said gear, a clutch element keyed to said drive shaft for sliding movement between said gears, means extending through the housing for shifting said clutch into contact with a said gear; driving mechanism within said housing comprising shafts mounted in the sides of the housing, an integral extension on one said shaft projecting beyond said housing to comprise one of said slitting and winding elements, and gears between said shafts and the gears on the drive shaft whereby one of the said slitting and winding elements is driven.

11. In a slitting machine a frame comprising a housing, said housing comprising cooperating sections, a half seat for a shaft in each said cooperating section, a shaft held between said half seats, slitting and winding elements projecting from a side of said frame, and means for operating said shaft and said slitting and winding elements.

12. In a slitting machine a frame comprising a housing having a side, said housing comprising cooperating sections, cooperating half seats for shafts in each of said cooperating sections, shafts held between said half seats and projecting from a side of said frame to comprise slitting and winding elements, and means for operating said shafts.

13. In a slitting machine a frame comprising a housing having a side, said housing comprising cooperating sections with abutting faces, a depression in one said face cooperating with a depression in the other said face to form a seat for a shaft bearing, a shaft mounted in said seat and projecting from a side of said frame to comprise a winding element, and means for operating said winding element.

14. In a slitting machine a frame comprising a housing having a side, said housing comprising cooperating sections with abutting faces, a depression in one said face cooperating with a depression in the other said face to form a seat for a shaft bearing, a shaft mounted at one end in said seat and projecting at the other end from a side of said frame to comprise a slitting element, and means for operating said slitting element.

15. In a slitting machine a frame comprising a housing having an extended side, said housing comprising cooperating sections with abutting homologous faces, cooperating depressions in said faces forming seats for shaft bearings, shafts mounted in said seats, certain of said shafts projecting freely from a side of said frame to comprise slitting and winding elements, and means for operating said slitting and winding elements.

16. In a slitting machine a frame comprising a housing having an extended base and an extended side, said housing comprising cooperating sections with abutting homologous faces having cooperating depressions forming seats for shaft bearings, slitting and winding elements mounted at one end in said seats and projecting at the other end from a side of said frame, and means within the housing for operating said slitting and winding elements.

17. In a slitting machine a frame, a guide mounted at one end on and projecting from said frame, a bar projecting from said frame and mounted for movement in said guide, slitting elements associated with said bar, and means for operating said bar to adjust said slitting elements.

18. In a slitting machine a frame, a guide attached at one end to and projecting from said frame, a bar mounted for sliding movement in said guide, means in said guide for operating said bar, slitting elements associated with said fulcrum bar, and means for operating said slitting elements.

19. In a slitting machine a frame, a guide attached thereto at one end and projecting therefrom, a fulcrum bar mounted for sliding movement in said guide, an eccentric in said guide for operating said fulcrum bar, means on the projecting end of said guide for turning said eccentric, means on the projecting end of said guide for fastening said turning means, slitting elements associated with said bar, and means for operating said slitting elements.

20. In a slitting machine a frame, a guide attached thereto at one end and projecting therefrom, a fulcrum bar mounted for slidable movement in said guide, an eccentric in said guide for operating said fulcrum bar, a handle connected to said eccentric, means in said handle cooperating with means in the projecting end of said guide for holding said eccentric immovable, slitting elements mounted on said bar, and means for operating said slitting elements.

21. In a slitting machine a frame comprising a housing, slitting elements projecting from said frame comprising a shaft mounted in the housing, a sleeve mounted upon the projecting portion of said shaft, a cylinder mounted upon said sleeve, and means within the housing for driving said shaft.

22. In a slitting machine a frame comprising a housing, slitting elements projecting from said frame comprising a shaft mounted in the sides of the housing, a sleeve mounted upon the projecting portion of said shaft, a cylinder mounted upon said sleeve to form a score roll, and means within the housing for driving said shaft.

23. In a slitting machine a frame, slitting means and a mill support roll mounted at one end on and projecting from said frame, a roll holder on the support and means for moving the holder along the support.

24. In a slitting machine a frame, slitting and winding means mounted at one end on and projecting at the other end from said frame comprising projecting means for supporting a travelling web during slitting, projecting means for supporting the roll from which the travelling web is taken, roll holding means thereon and means on the said supporting means for adjusting said roll holding means in a direction parallel to the axis of the said supporting means.

25. In a slitting machine a frame, slitting and winding means projecting from said frame comprising a stud, a sleeve mounted for longitudinal movement on the stud, means on the stud and for moving the sleeve lengthwise on the stud and spring pressed means on said sleeve for contact with an object carried by said sleeve.

26. In a slitting machine a frame, a stud projecting from said frame, a sleeve mounted for longitudinal movement on the stud, means for moving the sleeve longitudinally of the stud, means associated with the sleeve for frictional engagement with an object mounted on said sleeve, slitting means projecting from said frame, and winding means projecting from said frame.

27. In a slitting machine a frame, a stud projecting from said frame, a sleeve mounted for longitudinal movement on the stud, means revolvable in said sleeve and attached to said stud for moving the sleeve longitudinally of the stud, and adjustable spring pressed means encircling the sleeve for frictional engagement with an object mounted in said sleeve; slitting means projecting from said frame; winding means comprising a mandrel projecting from said frame; and means for driving said slitting and winding means.

28. In a slitting machine a frame comprising a housing having an extended side, a stud projecting from said side, a sleeve fitting over the stud, a key cooperating with the stud and sleeve to prevent rotation, a reduced end on the sleeve, means in said sleeve and attached to said stud for moving the sleeve longitudinally of the stud, a removable and longitudinally adjustable collar on the said reduced portion, a spring abutting said collar and means for abutting the spring and encircling the sleeve for frictional engagement with an object mounted on said sleeve; slitting means projecting from said side; winding means comprising a mandrel projecting from said frame, adjustable spring pressed means on said mandrel for applying end-wise friction to an object mounted on said mandrel; and means for driving said slitting and winding means.

29. In a slitting machine a frame comprising a housing having an extended side, a stud projecting from said side, a sleeve fitting over the stud, a key cooperating with the stud and sleeve to prevent rotation, a reduced end on the sleeve, means revolvable in said sleeve end and attached to said stud for moving the sleeve longitudinally of the stud, an internally threaded cap on the reduced end of the sleeve, a collar on the said reduced portion threaded into said cap, a spring abutting said collar, a washer abutting said spring and a flange on said washer surrounding the end of the large portion of said sleeve for frictional engagement with an object mounted on said sleeve; slitting means projecting from said side comprising a score roll; winding means comprising a mandrel projecting from said frame, spring pressed means on said mandrel for applying endwise friction to an object mounted on said mandrel, means for adjusting the pressure exerted by said spring pressed means; and means for driving said slitting and winding means.

30. In a slitting machine a frame comprising a housing having an extended side, a stud projecting from said side, a screw threaded in the end of said stud and provided with a shank, a sleeve fitting over the stud, a key cooperating with the stud and sleeve to prevent rotation, a reduced end on the sleeve, means on the screw shank to prevent longitudinal motion of the sleeve on the screw, means on the reduced end of the screw whereby the screw may be turned to move the sleeve longitudinally of the stud, an internally threaded cap on the reduced end of the sleeve, a collar on the said reduced portion threaded into said cap, a spring abutting said collar, a washer abutting said spring and a flange on said washer surrounding the end of the large portion of said sleeve for frictional engagement with an object mounted on said sleeve; slitting means projecting from said side comprising a nip roll; winding means comprising a mandrel projecting from said housing, a spring pressed washer on said mandrel having a flange for applying friction to an object mounted on said mandrel, means for adjusting the pressure exerted by said washer; and means for driving said slitting and winding means.

31. In a slitting machine a frame comprising a housing having an extended side, a stud projecting from said side, a keyway in said stud, a screw threaded in the end of said stud and provided with a shank having a reduced end, a sleeve provided with a keyway fitting over the stud, a key cooperating with the keyway to prevent rotation of the sleeve, a reduced end on the sleeve, means on the screw shank to prevent longitudinal motion of the sleeve on the screw, means on the reduced end of the screw whereby the screw may be turned to move the sleeve longitudinally of said stud, an internally threaded cap on the reduced end of the sleeve, a collar on the reduced portion threaded into said cap, a spring abutting said collar, a washer abutting said spring and a flange on said washer surrounding the end of the large portion of said sleeve for frictional engagement with objects mounted on said sleeve; slitting means projecting from said side comprising a nip roll; winding means comprising a mandrel projecting from said housing, a reduced end on said mandrel, an internally threaded cap on said reduced end, a collar on said reduced end threaded into said cap, a spring abutting said collar, a washer abutting said spring, a flange on said washer surrounding the end of said sleeve; and means for driving said slitting and winding means.

32. In a slitting machine a frame comprising a housing having an extended side, a stud projecting from said side, a keyway in said stud, a screw having a shank with a reduced end of irregular circumferential conformation threaded in the end of said stud, a sleeve provided with a keyway fitting over the stud, a key cooperating with the keyway to prevent rotation of the sleeve, a reduced end on the sleeve, blocks on the screw shank to prevent longitudinal motion of the sleeve on the screw, a hand wheel on the reduced end of the screw whereby the screw and sleeve may be moved longitudinally of said stud, a bayonet joint on the reduced end of said sleeve, an internally threaded cap jointed thereto, a collar having threads engaging the threads on said cap, a spring abutting said collar, a washer abutting said spring, and a flange on said washer surrounding the end of the large portion of said sleeve for frictional engagement with objects mounted on said sleeve; slitting means projecting from said side comprising a nip roll; winding means comprising a mandrel projecting from said housing, a reduced end on said mandrel, a bayonet joint on said reduced end, an internally threaded cap jointed thereto, a collar on said reduced end threaded into said cap, a spring abutting said collar, a washer abutting said spring, a flange on said washer surrounding the end of said sleeve; and means for driving said slitting and winding means.

33. In a slitting machine a frame, slitting and winding means projecting from said frame comprising a mandrel, a threaded cap on said mandrel, a collar in threaded engagement with said cap, a spring abutting said collar, and means abutting said spring for applying pressure to an object on said mandrel.

34. In a slitting machine a frame, slitting and winding means projecting from said frame comprising a mandrel, a reduced end on said mandrel, an internally threaded cap on said reduced end, a collar on said reduced end in threaded engagement with said cap, a spring abutting said collar, and means abutting said spring for applying pressure to an object on said mandrel.

35. In a slitting machine a frame, slitting means comprising an element supported at one end on, and projecting at the other end from, the frame, a support carried by and projecting from the frame, slitting means capable of cooperative action with said first-named slitting means, and means carried by the support for putting the slitting means in cooperative engagement.

36. In a slitting machine a frame, slitting and winding mechanism supported only at one end on, and projecting from, said frame, and means for driving said slitting and winding mechanism selectively at high speed or at low speed.

DAVID F. EVANS.
CLARENCE E. COLEMAN.

CERTIFICATE OF CORRECTION.

Patent No. 1,980,392.

November 13, 1934.

DAVID F. EVANS, ET AL.

It is hereby certified that error appears in the printed specification of the above numbered patent requiring correction as follows: Page 6, line 40, claim 23, for "support roll" read roll support; and that the said Letters Patent should be read with this correction therein that the same may conform to the record of the case in the Patent Office.

Signed and sealed this 8th day of January, A. D. 1935.

(Seal)

Leslie Frazer
Acting Commissioner of Patents.

with a shank having a reduced end, a sleeve provided with a keyway fitting over the stud, a key cooperating with the keyway to prevent rotation of the sleeve, a reduced end on the sleeve, means on the screw shank to prevent longitudinal motion of the sleeve on the screw, means on the reduced end of the screw whereby the screw may be turned to move the sleeve longitudinally of said stud, an internally threaded cap on the reduced end of the sleeve, a collar on the reduced portion threaded into said cap, a spring abutting said collar, a washer abutting said spring and a flange on said washer surrounding the end of the large portion of said sleeve for frictional engagement with objects mounted on said sleeve; slitting means projecting from said side comprising a nip roll; winding means comprising a mandrel projecting from said housing, a reduced end on said mandrel, an internally threaded cap on said reduced end, a collar on said reduced end threaded into said cap, a spring abutting said collar, a washer abutting said spring, a flange on said washer surrounding the end of said sleeve; and means for driving said slitting and winding means.

32. In a slitting machine a frame comprising a housing having an extended side, a stud projecting from said side, a keyway in said stud, a screw having a shank with a reduced end of irregular circumferential conformation threaded in the end of said stud, a sleeve provided with a keyway fitting over the stud, a key cooperating with the keyway to prevent rotation of the sleeve, a reduced end on the sleeve, blocks on the screw shank to prevent longitudinal motion of the sleeve on the screw, a hand wheel on the reduced end of the screw whereby the screw and sleeve may be moved longitudinally of said stud, a bayonet joint on the reduced end of said sleeve, an internally threaded cap jointed thereto, a collar having threads engaging the threads on said cap, a spring abutting said collar, a washer abutting said spring, and a flange on said washer surrounding the end of the large portion of said sleeve for frictional engagement with objects mounted on said sleeve; slitting means projecting from said side comprising a nip roll; winding means comprising a mandrel projecting from said housing, a reduced end on said mandrel, a bayonet joint on said reduced end, an internally threaded cap jointed thereto, a collar on said reduced end threaded into said cap, a spring abutting said collar, a washer abutting said spring, a flange on said washer surrounding the end of said sleeve; and means for driving said slitting and winding means.

33. In a slitting machine a frame, slitting and winding means projecting from said frame comprising a mandrel, a threaded cap on said mandrel, a collar in threaded engagement with said cap, a spring abutting said collar, and means abutting said spring for applying pressure to an object on said mandrel.

34. In a slitting machine a frame, slitting and winding means projecting from said frame comprising a mandrel, a reduced end on said mandrel, an internally threaded cap on said reduced end, a collar on said reduced end in threaded engagement with said cap, a spring abutting said collar, and means abutting said spring for applying pressure to an object on said mandrel.

35. In a slitting machine a frame, slitting means comprising an element supported at one end on, and projecting at the other end from, the frame, a support carried by and projecting from the frame, slitting means capable of cooperative action with said first-named slitting means, and means carried by the support for putting the slitting means in cooperative engagement.

36. In a slitting machine a frame, slitting and winding mechanism supported only at one end on, and projecting from, said frame, and means for driving said slitting and winding mechanism selectively at high speed or at low speed.

DAVID F. EVANS.
CLARENCE E. COLEMAN.

CERTIFICATE OF CORRECTION.

Patent No. 1,980,392.

November 13, 1934.

DAVID F. EVANS, ET AL.

It is hereby certified that error appears in the printed specification of the above numbered patent requiring correction as follows: Page 6, line 40, claim 23, for "support roll" read roll support; and that the said Letters Patent should be read with this correction therein that the same may conform to the record of the case in the Patent Office.

Signed and sealed this 8th day of January, A. D. 1935.

(Seal)

Leslie Frazer
Acting Commissioner of Patents.